United States Patent
Potlapally et al.

(10) Patent No.: US 9,935,937 B1
(45) Date of Patent: Apr. 3, 2018

(54) IMPLEMENTING NETWORK SECURITY POLICIES USING TPM-BASED CREDENTIALS

(71) Applicant: Amazon Technologies, Inc., Seattle, WA (US)

(72) Inventors: Nachiketh Rao Potlapally, Arlington, VA (US); Alexander Robin Gordon Lucas, Cheltenham (GB)

(73) Assignee: Amazon Technologies, Inc., Seattle, WA (US)

( * ) Notice: Subject to any disclaimer, the term of this patent is extended or adjusted under 35 U.S.C. 154(b) by 245 days.

(21) Appl. No.: 14/533,395

(22) Filed: Nov. 5, 2014

(51) Int. Cl.
*G06F 17/00* (2006.01)
*H04L 29/06* (2006.01)

(52) U.S. Cl.
CPC ...... *H04L 63/0823* (2013.01); *H04L 63/0853* (2013.01); *H04L 63/20* (2013.01)

(58) Field of Classification Search
CPC .. H04L 63/0823; H04L 63/20; H04L 63/0853
See application file for complete search history.

(56) References Cited

U.S. PATENT DOCUMENTS

| | | | | |
|---|---|---|---|---|
| 2005/0015471 A1* | 1/2005 | Zhang | ................. | H04L 63/0442 709/221 |
| 2006/0031680 A1* | 2/2006 | Maiman | ................. | H04L 63/14 713/182 |
| 2008/0155678 A1* | 6/2008 | Ohkubo | ................ | H04L 63/102 726/15 |
| 2009/0328225 A1* | 12/2009 | Chambers | ............... | G06F 21/10 726/26 |
| 2010/0235649 A1* | 9/2010 | Jeffries | ................ | G06F 21/6209 713/189 |
| 2012/0265976 A1* | 10/2012 | Spiers | ................. | H04L 63/0218 713/2 |
| 2013/0073854 A1* | 3/2013 | Patti | ....................... | H04L 9/0825 713/171 |
| 2013/0111547 A1* | 5/2013 | Kraemer | ............... | G06F 21/552 726/1 |
| 2014/0137178 A1* | 5/2014 | Thom | .................. | G06F 21/6218 726/1 |
| 2014/0181517 A1* | 6/2014 | Alaranta | ............... | H04L 63/062 713/168 |

* cited by examiner

*Primary Examiner* — Teshome Hailu
(74) *Attorney, Agent, or Firm* — Klarquist Sparkman, LLP

(57) ABSTRACT

A method for implementing network security policies in a multi-tenant network environment may include receiving a request for implementation of at least one network security policy on one or more computing devices of a service provider cloud environment. The network security policy identified by the request may be retrieved. The network security policy may be encrypted using encrypting credentials of the one or more computing devices. Decrypting credentials corresponding to the encrypting credentials are stored in a Trusted Platform Module (TPM) within the one or more computing devices. The encrypted network security policy may be pushed to the one or more computing devices, for decryption and implementation at the one or more computing devices.

20 Claims, 9 Drawing Sheets

IMPLEMENTING NETWORK SECURITY POLICIES USING TPM-BASED CREDENTIALS

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs. Additionally, secure communications in the cloud computing environment are an important consideration as they ensure authentication of the communicating parties, as well as integrity and security of the communication itself. However, the setup of secure communications can be a difficult task for the communicating parties in the cloud computing environment.

For example, entity authentication within the cloud computing environment may be based on digital certificates, which may have to be issued to multiple parties. However, the process of obtaining digital certificates is time-consuming, and issuing certificates for an extended period of time may lead to unauthorized use of the certificates causing security breaches in the cloud computing environment. The setup of secure communication based on network security policies may also be challenging and time-consuming since different policies may have to be installed on multiple server computers.

BRIEF DESCRIPTION OF THE DRAWINGS

Various embodiments in accordance with the present disclosure will be described with reference to the drawings, in which.

DETAILED DESCRIPTION

Figure 1:
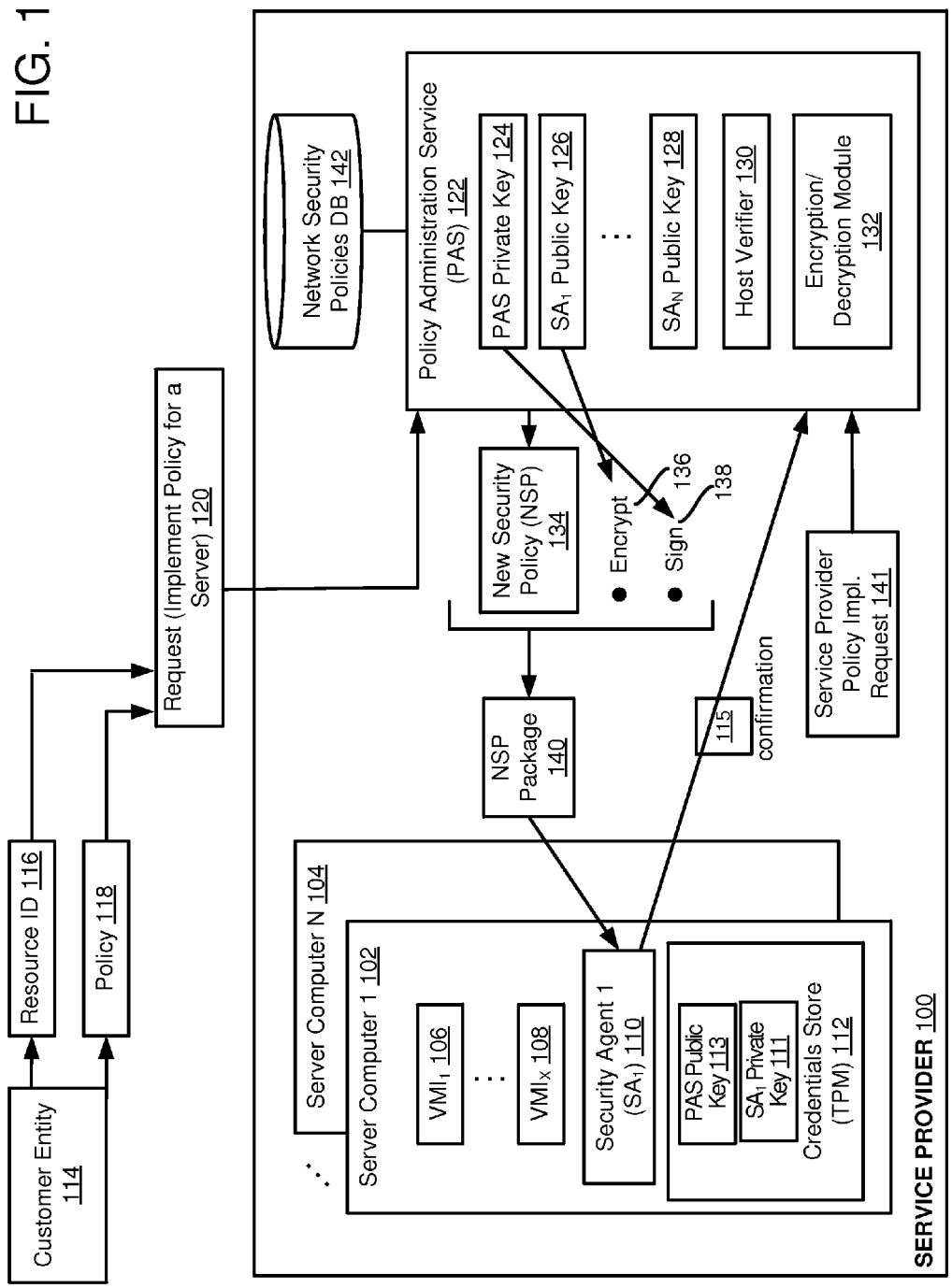
FIG. 1 is a diagram of an example network environment supporting using a policy administration service for implementing network security policies using TPM-based credentials, in accordance with an embodiment of the disclosure.

The following description is directed to techniques and solutions supporting implementation of network security policies using TPM-based credentials (i.e., credentials such as private and/or public keys or a multi-level set of keys stored in a secure manner, such as using a TPM or other secure storage). The techniques disclosed herein are based on leveraging TPMs to create secure host-based network endpoints, which implement authorized network security policies. Creating a secure network endpoint may utilize provisioning network credentials, such as SSL and Internet Protocol Security (IPSec) secure cryptographic keys, as well as network security policies, such as firewalls and ACLs, to hosts.

A network security policy specifying credentials (e.g., SSL and IPSec keys), Access Control Lists (ACLs) and firewall settings may be encrypted with a cryptographic key such that it can be successfully decrypted only by TPM-based keys available in the intended host. A security agent running on the host may verify and decrypt the received network policy using the TPM-based keys, and if the verification is successful, the security agent may proceed to install the credentials, ACLs, firewalls, and other network security policies. The credentials (e.g., SSL keys and IPSec keys) may be wrapped with TPM-based keys, and stored securely on the host. Such credentials may be used for creating SSL/TLS sessions and IPSec tunnels.

The network security policies may be updated and the policy updates may be signed and encrypted as described above, and may be applied to the host upon successful verification by the security agent. Periodically, the security agent may sign the existing ACLs/firewalls, or generate a hash of these firewalls, and may send the signed value to a server (e.g., a policy administration service) for verification. The generated hash value may be signed with a TPM-based private key, and can be verified by the policy administration service using the corresponding public key (which is published). In this regard, network security policies may be implemented and configured in a secure and automated manner in an enterprise network or in a public-cloud (or private-cloud) environment. Higher level security policies can be formulated as well, where the higher level security policies may be used to specify applications which are allowed to interact with each other in a networked environment, restrictions associated with specific hosts or virtual machines running on hosts, as well as other higher level policies. Such higher level policies may be mapped to a low-level network security policy comprising credentials, ACLs and firewalls, which may be automatically deployed to hosts using techniques described herein.

As used herein, the term "virtual machine image" may be used to indicate a virtual machine containing an operating system (e.g., Linux) and other data needed to launch the virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment.

As used herein, the term "network security policy" may include one or more of the following: lower-level security policies such as credentials (e.g., SSL and IPSec keys), Access Control Lists (ACLs), firewall settings and rules (e.g., generic firewall rules associated with IP addresses, firewall rules associated with a host class, communication rules and restrictions for communication between specific applications or servers, firewall rules for specific domains that include a plurality of VMIs on a plurality of servers, and other firewall rules), bandwidth rules (what communication bandwidth is allowed between certain instances), type of services allowed (e.g., restriction of communications to/from instances or between instances), type of packets allowed for communication between instances, settings for one or more network protocols (e.g., HTTP, HTTPS, SMDP, and so forth), and higher-level security policies (e.g., rules associated with communication between specific applications, VMIs and/or servers). Additionally, a network security policy may be defined using a detailed specification (e.g., provided by a service provider and/or a customer of the service provider) as well as using higher level statements based on meta-language (e.g., application A cannot communicate to application B and can only communicate to applications C and D).

FIG. 1 is a diagram of an example network environment supporting using a policy administration service for implementing network security policies using TPM-based credentials, in accordance with an embodiment of the disclosure. Referring to FIG. 1, the illustrated network environment may comprise a service provider 100 and a customer entity 114. The service provider 100 may be, for example, a cloud provider that is capable of delivery of computing and storage capacity as example services to a community of end recipients (e.g., tenants or customers), such as the customer entity 114. The service provider 100 may comprise a plurality of server computers 102, . . . , 104, a policy administration service (PAS) 122, and a network security policy database 142.

The PAS 122 may comprise suitable logic, circuitry, interfaces, and/or code and may be operable to provide services associated with network security policies within the service provider 100. For example, the PAS 122 may store a plurality of public keys 126, . . . , 128 associated with security agents (SAs) within the plurality of servers 102, . . . , 104 (e.g., SA 110 in server 102). The PAS may include a host verifier 130, which may be used to verify that customer entities that communicate policy-related requests have rights to the hosts (or servers) associated with the requests (e.g., the customer is associated with a valid customer account and is paying a fee to run one or more VMIs on a server). The PAS 122 may further include an encryption/decryption module 132, which may be operable to encrypt/decrypt one or more network security policy packages using one or more cryptographic keys. The PAS 122 may have access to the network security policy database 142 to access one or more network security policies for implementation at a VMI and/or server computer.

The server computers 102, . . . , 104 may include one or more virtual machine instances (VMIs) (e.g., VMIs 106, . . . , 108 in server computer 102) launched by the service provider 100 on behalf of the customer entity 114 (e.g., the customer entity 114 administers the VMIs 106, . . . , 108). The server computers may each include a security agent (SA), such as SA 110 in server 102. The SA may comprise suitable logic, circuitry, interfaces, and/or code and may be operable to receive encrypted network security policy packages, verify the signature if the package is signed, decrypt them using one or more private cryptographic keys (e.g., the SA private key 111 stored in the credentials store 112, which can be a TPM), and then install the network security policies (e.g., as part of a hypervisor or other operating system associated with the server computer). The SA may also provide a confirmation back to the PAS 122 of successful implementation (or install) of the received network security policies. A confirmation may then be sent from the PAS 122 to the customer entity 114 of successfully implemented policy.

Figure 3:
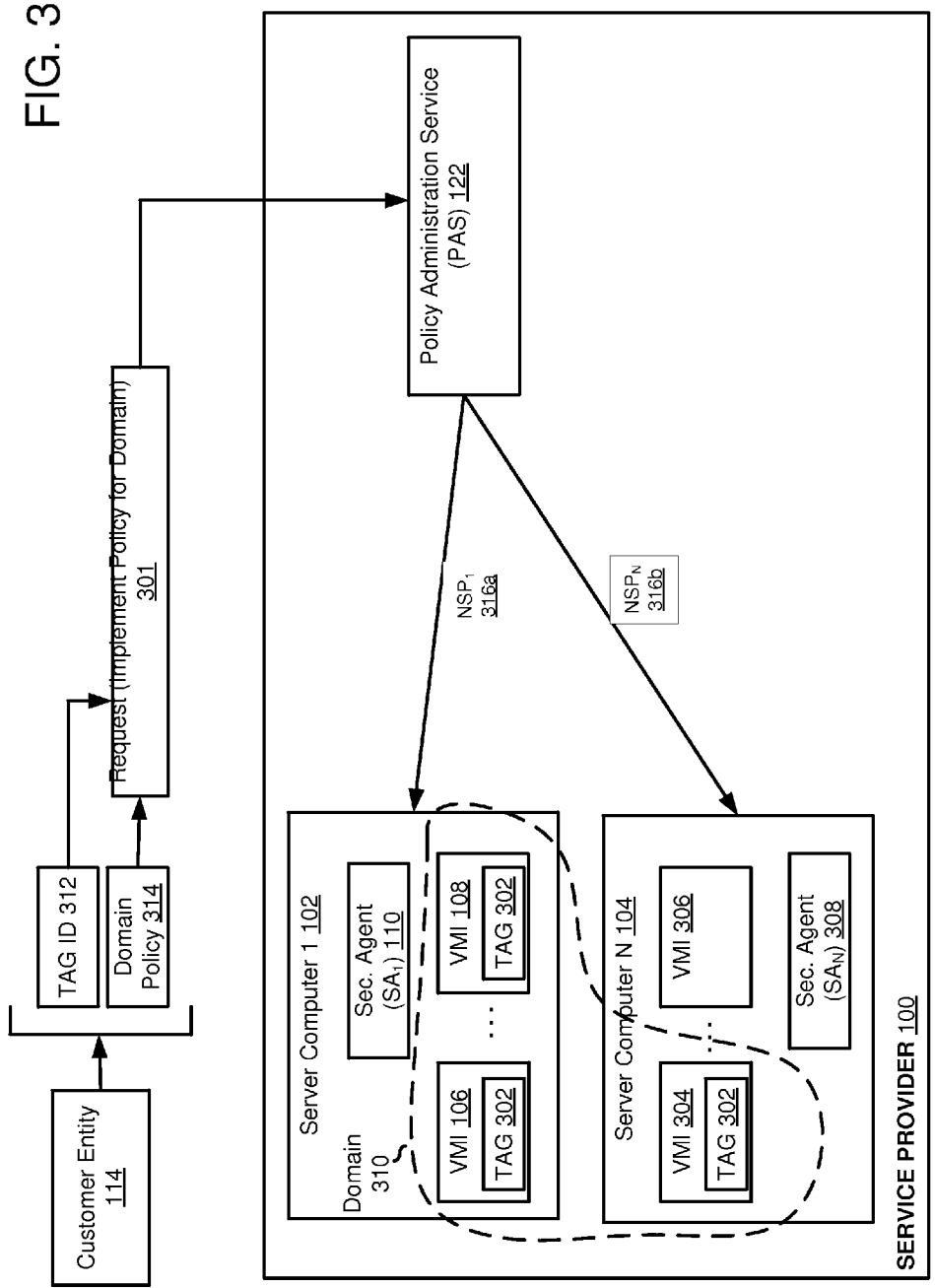
FIG. 3 is a diagram of an example network environment supporting using a policy administration service for implementing network security policies in a network domain, in accordance with an embodiment of the disclosure.

In operation, the customer entity 114 may issue a request 120 to the PAS 122. The request 120 may be a request for implementing a network security policy at a server computer (e.g., 102) or another network resource (e.g., one or more VMIs or a network domain) associated with a customer account of customer entity 114. The request 120 may include policy information 118 (identifying the network security policy for implementation) and a network resource ID 116. The resource ID 116 may include an IP address or any other information (e.g., a tag as seen in FIG. 3) identifying one or more network resources associated with an account of customer 114. The request 120 may be received using an application programming interface (API), a console user interface associated with a console of the service provider 100, using command line tools, and/or using other console set of tools provided by the service provider 100.

After the PAS 122 receives the request 120, it may initially verify the network resource (e.g., server 102) identified with resource ID 116 is associated with a customer account of the entity 114. If the resource ID 116 identifies a VMI (e.g., VMI 106), then PAS 122 may verify VMI 106 is associated with a customer account of entity 114, and then may determine the server computer (e.g., 102) that VMI 106 is running on. The PAS 122 may retrieve the network security policy identified by policy information 118. In one instance, the information 118 may include the network security policy (NSP) 134 (i.e., the policy is provided by the customer entity 114). In another instance, the network security policy 134 may be retrieved from the network security policy database 142 based on the policy information 118.

Once the NSP 134 is retrieved, the PAS 122 may encrypt it (136) using the public cryptographic key 126 associated with the security agent 110 at the server computer 102. The NSP 134 may also be signed (138) using the private cryptographic key 124 of the PAS 122. A corresponding public key for the PAS (113) may be publicly available and a copy may be stored in the credentials store 112 at server 102. The encrypted and signed NSP may be communicated to server 102 as NSP package 140. Optionally, the server computer 102 may obtain the PAS public key 113 through a chain of trust (e.g., from a Certificate Authority, or CA), and the PAS public key 113 may be verified using the chain of trust and the CA.

Once received at server 102, the security agent 110 may verify the signature of the NSP package 140 using the PAS public key 113. Once the signature is verified, the SA 110 may decrypt the NSP package 140 to obtain the NSP 134 using the SA private key 111, which is stored at credentials store 112. The SA 110 may then install the NSP 134 at server 102 (e.g., install at a hypervisor (e.g., example hypervisor is illustrated in reference to FIG. 4) or at another operating system associated with server 102.

In instances when the NSP 134 is designated for implementation at one or more VMIs (e.g., VMI 106), then the SA 110 may install the NSP 134 at an operating system (or secure memory location) associated with the one or more VMIs.

The credentials store 112 may be implemented as a hardware TPM within the server computer 102. In other instances, the TPM 112 may be implemented in software, e.g., as a secure memory page associated with a hypervisor or another operating system for the server 102. Additionally, even though only a single TPM 112 is illustrated in FIG. 1 and is being used in connection with implementing network security policies associated with the server 102, other TPM modules may also be used within the server 102. More specifically, a TPM may be implemented (in hardware or software) and may be associated with each VMI within the servers 102, ..., 104. Such TPMs may store, for example, secure cryptographic keys associated only with the specific VMI (or server) the TPM is implemented with.

Once the NSP 134 is decrypted and implemented by the SA 110, a confirmation 115 of successful policy implementation may be communicated back to the PAS 122. The PAS 122 may send a similar confirmation to the customer entity 114 notifying the entity of the successful implementation.

Even though public-private key pair authentication is illustrated in reference to FIG. 1, the present disclosure is not limited in this regard and other authentication methods may also be used (e.g., a multi-level set of keys). Additionally, even though a request 120 for policy implementation is received from a customer entity 114, the disclosure is not limited in this regard. More specifically, a policy implementation request 141 may be received internally, from within the service provider 100. For example, a network administrator of the service provider 100 may communicate the policy implementation request 141 to the PAS 122 in order to implement policies on one or more server computers or other computing devices (e.g., network routers, etc.) within the service provider 100.

Figure 2:
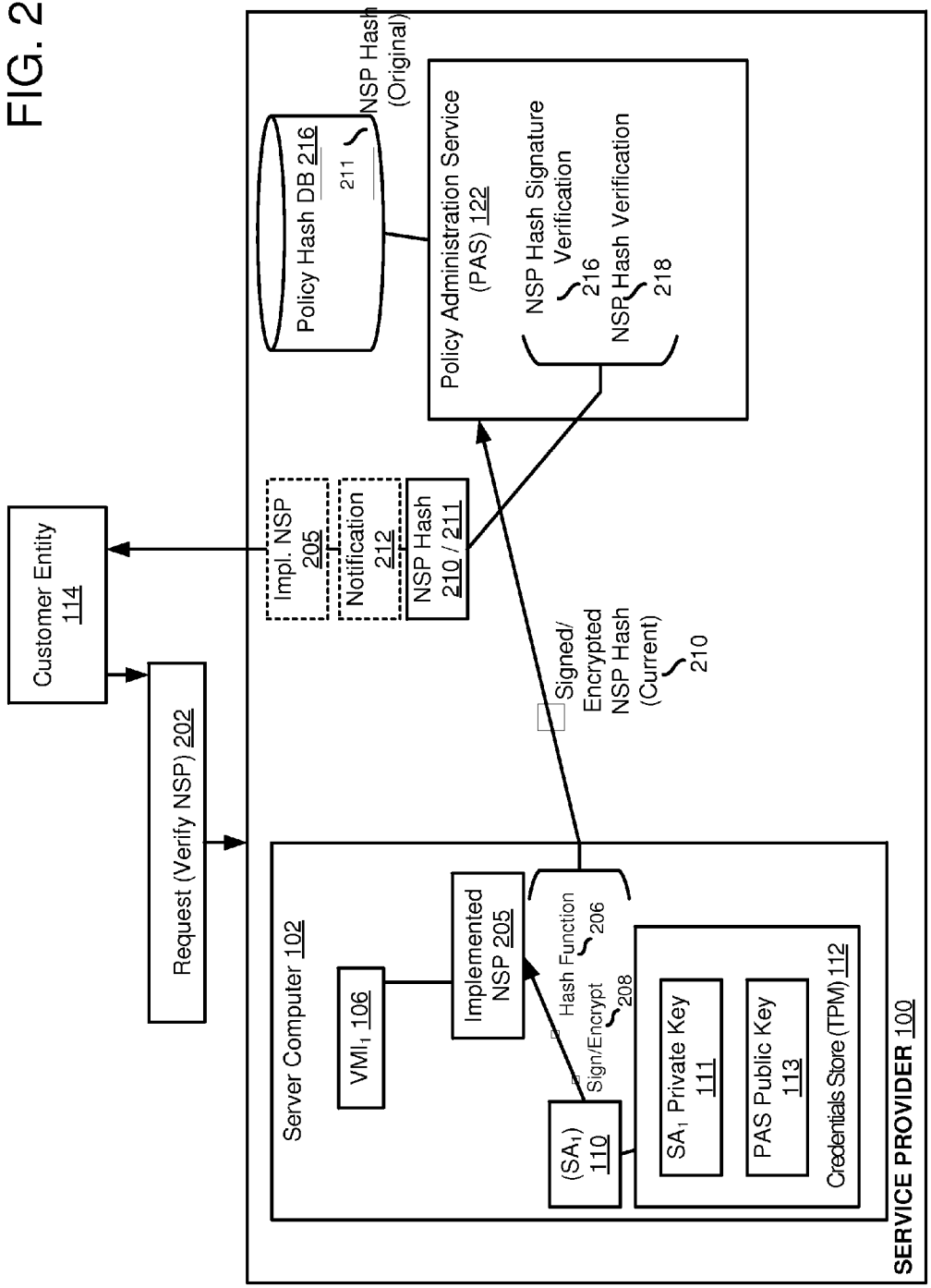
FIG. 2 is a diagram of an example network environment supporting using a policy administration service for network security policy verification, in accordance with an embodiment of the disclosure.

FIG. 2 is a diagram of an example network environment supporting using a policy administration service for network security policy verification, in accordance with an embodiment of the disclosure. Referring to FIG. 2, there is illustrated an implementation of the network environment of FIG. 1 used in connection with network security policy verification. For example, the customer entity 114 may issue a request 202 (e.g., an API request) for verifying a NSP 205 implemented at server computer 102. AT the time the NSP 205 was implemented (e.g., after initial implementation as described in connection with FIG. 1), the SA 110 may generate an encrypted hash 211 (e.g., using hash function 206 and sign/encrypt function 208) of the NSP 205 as initially implemented. Such NSP hash 211 (which is indicative of the NSP as originally implemented and prior to any subsequent changes from, e.g., a hacker or user of server 102) may be stored by the PAS 122 in a policy hash database 216.

Once the PAS 122 receives the request 202 for policy verification, the PAS 122 may request a current hash 210 of the NSP 205. The SA 110 may use hash function 206 and sign/encrypt function 208 to generate the signed/encrypted NSP hash 210. The sign/encryption function 208 may be used to encrypt the hash 210 using the PAS public key 113 and sign the package using the SA private key 111. Once receive, the PAS 122 may use NSP hash signature verification 216 to verify the signature (e.g., using the SA public key 126) and decrypt the NSP hash 210 using the PAS private key 124.

The NSP hash verification function 218 may then be performed, where the decrypted NSP hash 210 (of the current state of the NSP 205) may be compared with the original NSP hash 211. A corresponding notification 212 may be communicated back to the customer entity 114, notifying the entity of successful verification (both hashes 210 and 211 match) or verification failure (210 does not match 211). Alternatively and in response to the request 202, the PAS 122 may communicate both hashes 210 and 211 to the customer entity 114 or a copy of the NSP 205 as currently implemented (entity 114 may have a copy of the originally implemented NSP to compare with the current NSP).

FIG. 3 is a diagram of an example network environment supporting using a policy administration service for implementing network security policies in a network domain, in accordance with an embodiment of the disclosure. Referring to FIG. 3, there is illustrated an implementation of the network environment of FIG. 1 used in connection with an API request for implementing a network security policy on a network domain. As used herein, the term "domain" or "network domain" may refer to two or more server computers or two or more VMIs (on the same or different servers) that have been designated to belong in a separate network or sub-network.

The customer entity 114 may be running VMIs 106, ..., 108 on server computer 102, and VMIs 304, ..., 306 on server computer 104. Additionally, the customer entity 114 may have designated VMIs 196, ..., 108 and 304 as VMIs associated with a network domain 310. For example, VMIs 106, ..., 108 and 304 may be tagged with a tag 302 (e.g., one or more text fields in a memory location or a file) designating the tagged VMIs as belonging to the domain 310. Additionally, the tag 302 may specify one or more network settings associated with the domain 310, such as a dedicated IP address, dedicated network security policy, and so forth.

The PAS 122 may receive the request 301 (e.g., an API request) for implementing a network security policy for the domain 310 associated with the tag ID 312 (e.g., the tag ID 312 may identify tag 302 so that all VMIs with tag 302 will be selected for NSP implementation). The domain policy 314 may identify the NSP to be implemented on the domain (e.g., 310) associated with tag (e.g., 302) identified by the tag ID 312.

During the NSP package preparation process (e.g., as discussed above in reference to FIG. 1), the PAS 122 may determine which VMIs (e.g., 106, ..., 108 and 302) are associated with domain 310, and then which server computers (e.g., 102, 104) and security agents (e.g., 110, 308) are associated with such VMIs. The PAS 122 may determine which SA public keys to use based on the SA determination (e.g., Public keys 126 and 128 may be selected as corresponding to server computers 102 and 104, respectively). The PAS 122 may use the SA public keys 126 and 128 to encrypt the network security policy and generate two separate packages NSP 316a (encrypted with public key 126) and 316b (encrypted with public key 128). The encrypted NSP packages 316a and 316b may be communicated to SAs 110 and 308, respectively. The SAs 110 and 308 may decrypt the NSP packages using their corresponding private keys (e.g., as stored by TPM modules within servers 102 and 104), and may implement the decrypted NSP at VMIs 106, . . . , 108 and 304 associated with network domain 310.

Figure 4:
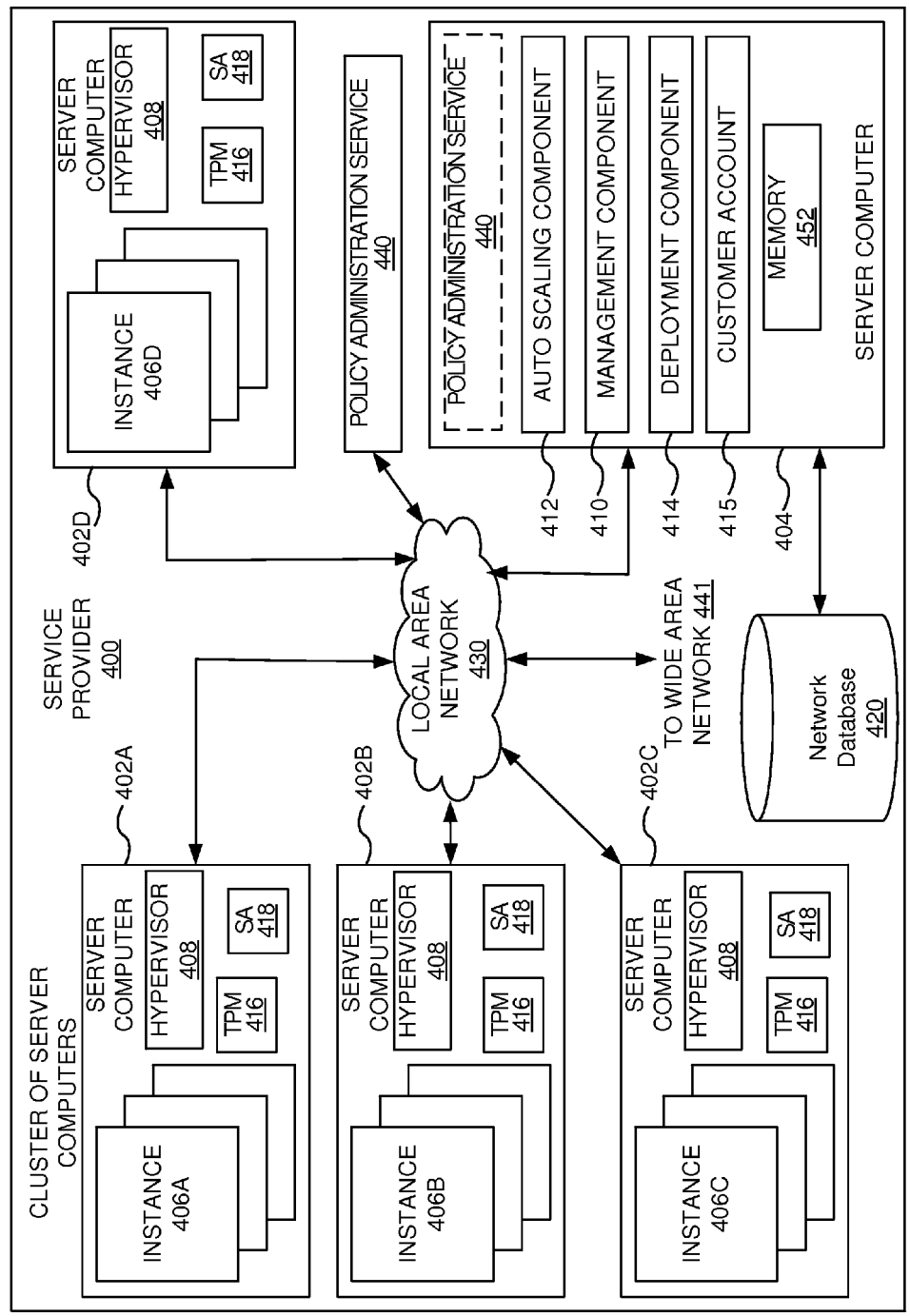
FIG. 4 is an example system diagram showing a plurality of virtual machine instances running in a multi-tenant environment, using a policy administration service, in accordance with an example embodiment of the disclosure.

FIG. 4 is an example system diagram showing a plurality of virtual machine instances running in a multi-tenant environment, using a policy administration service, in accordance with an example embodiment of the disclosure. More specifically, FIG. 4 is a computing system diagram of a network-based service provider 400 that illustrates one environment in which embodiments described herein can be used. By way of background, the service provider 400 (i.e., the cloud provider) is capable of delivery of computing and storage capacity as a service to a community of end recipients (e.g., tenants or customers). The service provider 400 may be the same as the service provider 100 illustrated in FIGS. 1-3.

In an example embodiment, the service provider 400 can be established for an organization by or on behalf of the organization. That is, the service provider 400 may offer a "private cloud environment." In another embodiment, the service provider 400 supports a multi-tenant environment, wherein a plurality of customers operate independently (i.e., a public cloud environment). Generally speaking, the service provider 400 can provide the following models: Infrastructure as a Service ("IaaS"), Platform as a Service ("PaaS"), and/or Software as a Service ("SaaS"). Other models can be provided. For the IaaS model, the service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service provider platform without the cost of buying and managing the underlying hardware and software. The SaaS model allows installation and operation of application software in the service provider. In some embodiments, end users access the service provider 400 using networked customer devices, such as desktop computers, laptops, tablets, smartphones, etc. running web browsers or other lightweight customer applications. Those skilled in the art will recognize that the service provider 400 can be described as a "cloud" environment.

The particular illustrated service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications.

In an example embodiment, each of the server computers 402A-402D may also comprise a TPM module 416 and a security agent (SA) 418, which may perform network security policy implementation functionalities similar to TPM 112 and SA 110 as discussed in reference to FIG. 1.

Figure 5:
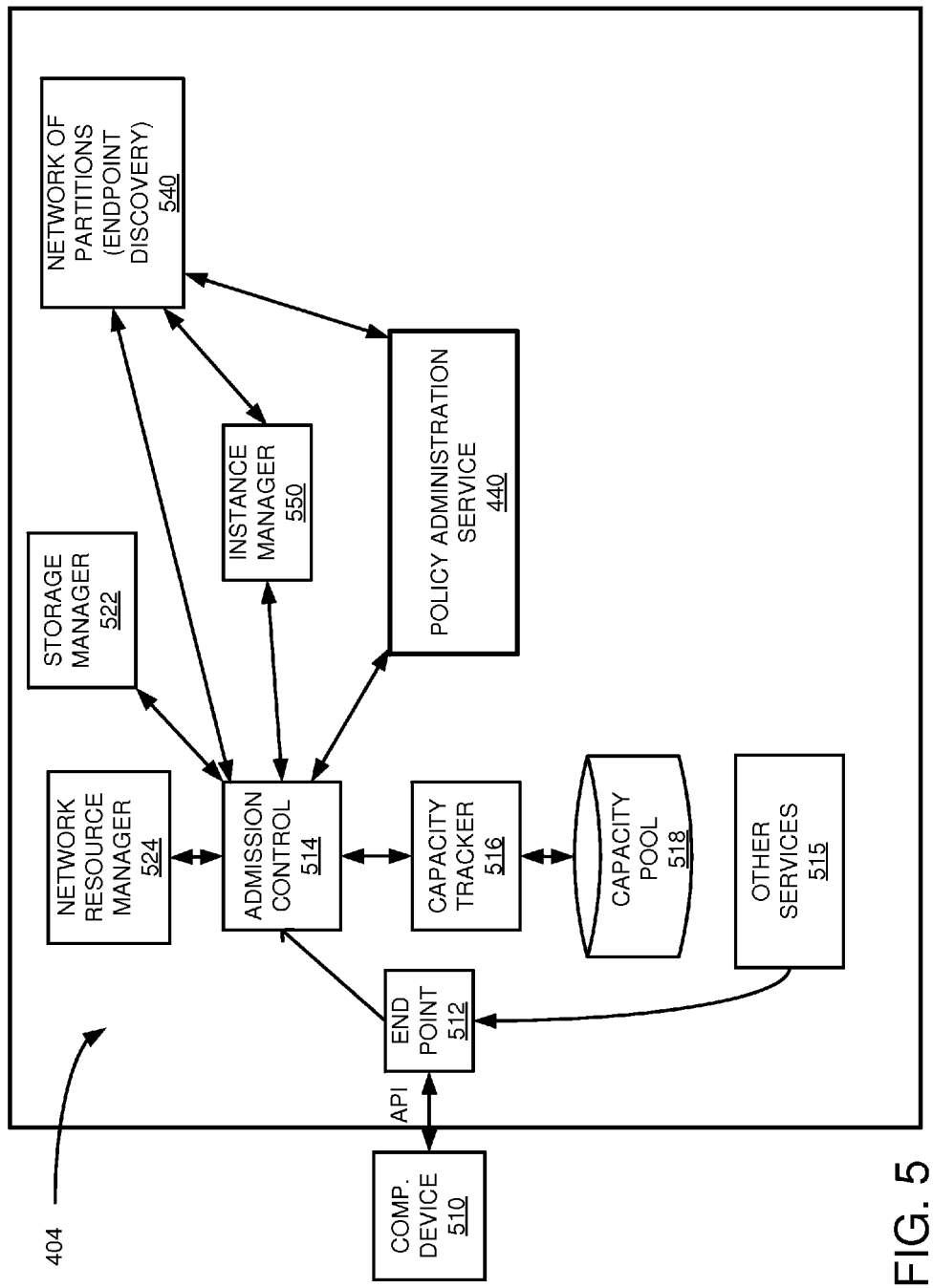
FIG. 5 shows further details of an example system including a plurality of management components associated with a control plane, which may be used to provide network security policy implementation according to one embodiment.

The service provider 400 may also comprise a policy implementation service (PAS), such as PAS 122, which may have the functionalities described herein in connection with the PAS 122 of FIGS. 1-3. The policy administration service 440 may be implemented as a stand-alone service within the provider 400, as a dedicated server (similar to the servers 402A-402D), and/or may be implemented as part of the server computer 404 that performs management functions. For example, the policy implementation service 440 may be implemented as part of the management component 410 (as seen in FIG. 5). The PAS 440 may use a network database 420, which may combine the functionalities of databases 142 and 216 illustrated in FIGS. 1 and 2, respectively.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402, the instances 406, the hypervisors 408, and/or the endpoint selection service 440. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand.

The server computer 404 may further comprise memory 452, which may be used as processing memory by the endpoint selection service 440. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager (e.g., 550 in FIG. 5) can be considered part of the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 441 so that end-users can access the service provider 400. It should be appreciated that the network topology illustrated in FIG. 4 has been simplified and that many more networks and networking devices can be utilized to interconnect the various computing systems disclosed herein.

FIG. 5 shows further details of an example system including a plurality of management components associated with a control plane, which may be used to provide network security policy implementation according to one embodiment. More specifically, FIG. 5 illustrates in further detail the management server 404, which may implement the policy implementation service 440 within the multi-tenant environment of the service provider 400.

In order to access and utilize instances (such as instances 406 of FIG. 4), a customer device can be used. The customer device 510 can be any of a variety of computing devices, mobile or otherwise, including a cell phone, smartphone, handheld computer, Personal Digital Assistant (PDA), desktop computer, etc. The customer device 510 can communicate with the service provider 400 through an end point 512, which can be a DNS address designed to receive and process application programming interface (API) requests (e.g., requests 120, 202 and 301). In particular, the end point 512 can be a web server configured to expose an API. Using the API requests, a customer device 510 can make requests to implement any of the functionality described herein or to access one or more services provided by the service provider 400. Other services 515, which can be internal to the service provider 400, can likewise make API requests to the end point 512. The API requests from the client can pass through the admission control 514 and onto the policy implementation service 440 in order to access policy implementation functionalities of the service provider 400.

Other general management services that may or may not be included in the service provider 400 (and/or within the management component 410) include an admission control 514, e.g., one or more computers operating together as an admission control web service. The admission control 514 can authenticate, validate and unpack the API requests for service or storage of data within the service provider 400. The capacity tracker 516 is responsible for determining how the servers need to be configured in order to meet the need for the different instance types by managing and configuring physical inventory in terms of forecasting, provisioning, and real-time configuration and allocation of capacity. The capacity tracker 516 maintains a pool of available inventory in a capacity pool database 518. The capacity tracker 516 can also monitor capacity levels so as to know whether resources are readily available or limited.

An instance manager 550 controls launching and termination of virtual machine instances in the network. When an instruction is received (such as through an API request) to launch an instance, the instance manager 550 pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6, and includes a physical layer upon which the instances are launched.

The policy implementation service 440 may perform the policy implementation functionalities described herein (e.g., the functionalities described in reference to FIGS. 1-3). The PAS 440 may communicate with the admission control 514 (e.g., to receive new API service requests) and with the network of partitions 540 (to select one or more endpoints from a set of available endpoints).

Figure 6:
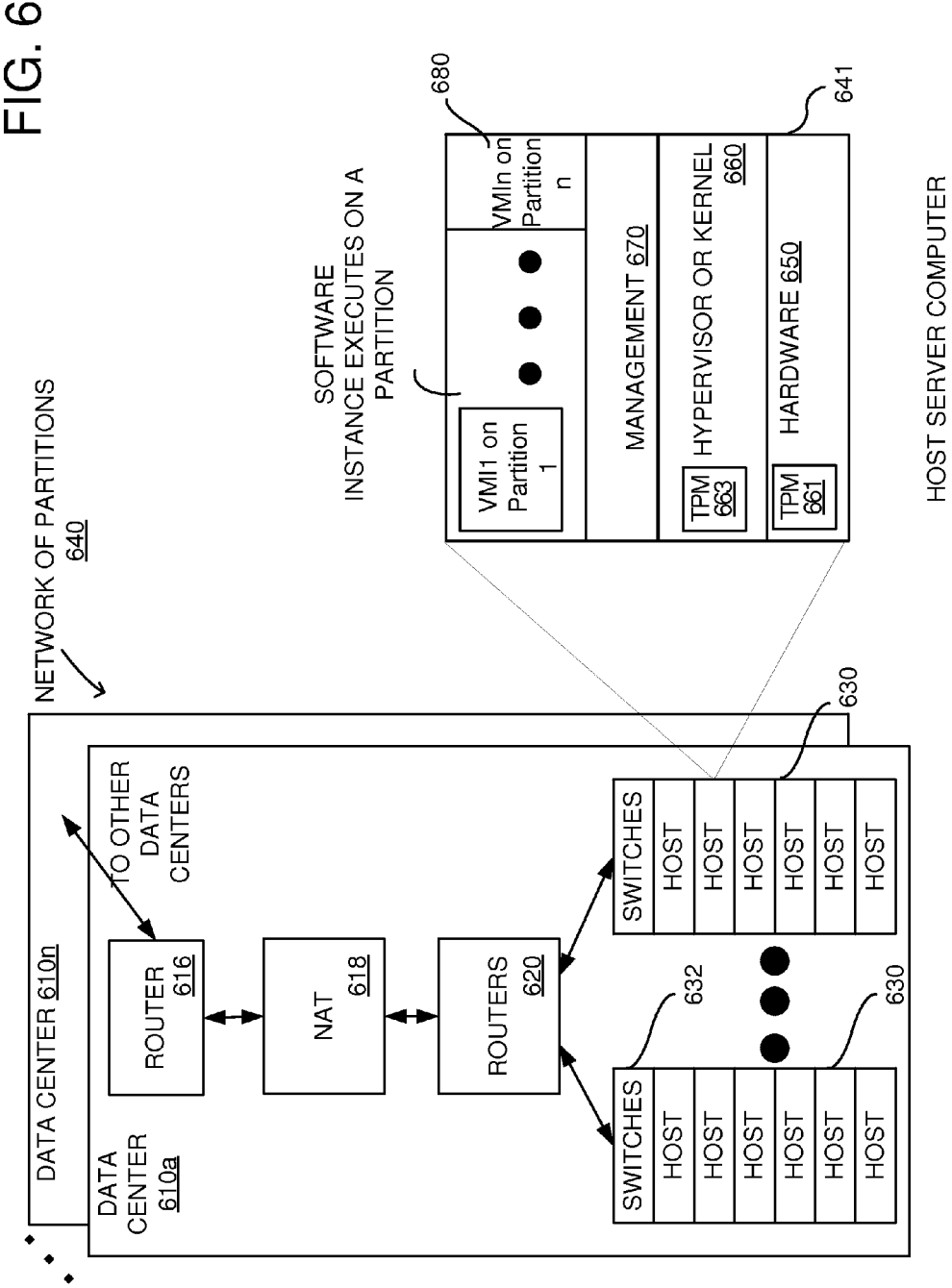
FIG. 6 shows an example of a plurality of host computers, routers, and switches—which are hardware assets used for running virtual machine instances—with the host computers having network security policy implementation-related functionalities that may be configured according to one embodiment.

FIG. 6 shows an example of a plurality of host computers, routers, and switches—which are hardware assets used for running virtual machine instances—with the host computers having network security policy implementation-related functionalities that may be configured according to one embodiment. More specifically, FIG. 6 illustrates the network of partitions 640 and the physical hardware associated therewith. The network of partitions 640 can include a plurality of data centers, such as data centers 610a, . . . , 610n, coupled together by routers, such as router 616.

The router 616 reads address information in a received packet and determines the packet's destination. If the router decides that a different data center contains a host server computer, then the packet is forwarded to that data center. If the packet is addressed to a host in the data center 610a, then it is passed to a network address translator (NAT) 618 that converts the packet's public IP address to a private IP address. The NAT 618 also translates private addresses to public addresses that are bound outside of the data center 610a. Additional routers 620 can be coupled to the NAT 618 to route packets to one or more racks 630 of host server computers. Each rack 630 can include a switch 632 coupled to multiple host server computers. A particular host server computer is shown in an expanded view at 641.

Each host 641 has underlying hardware 650. The hardware layer 650 may include a TPM module 661 for performing the TPM-related functions described herein (e.g., similar to TPM 112 of FIG. 1). Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used. In an example embodiment, the hypervisor layer 660 may include a TPM module 663, which may be implemented in software and may perform the TPM-related functions described herein (e.g., similar to TPM 112 of FIG. 1).

A management layer 670 can be part of the hypervisor or separated therefrom, and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system (e.g., VMI1 may be running on partition 1 and VMIn may be running on partition n). As such, each partition 680 is an abstract portion of capacity designed to support its own virtual machine independent of the other partitions.

Figure 7:
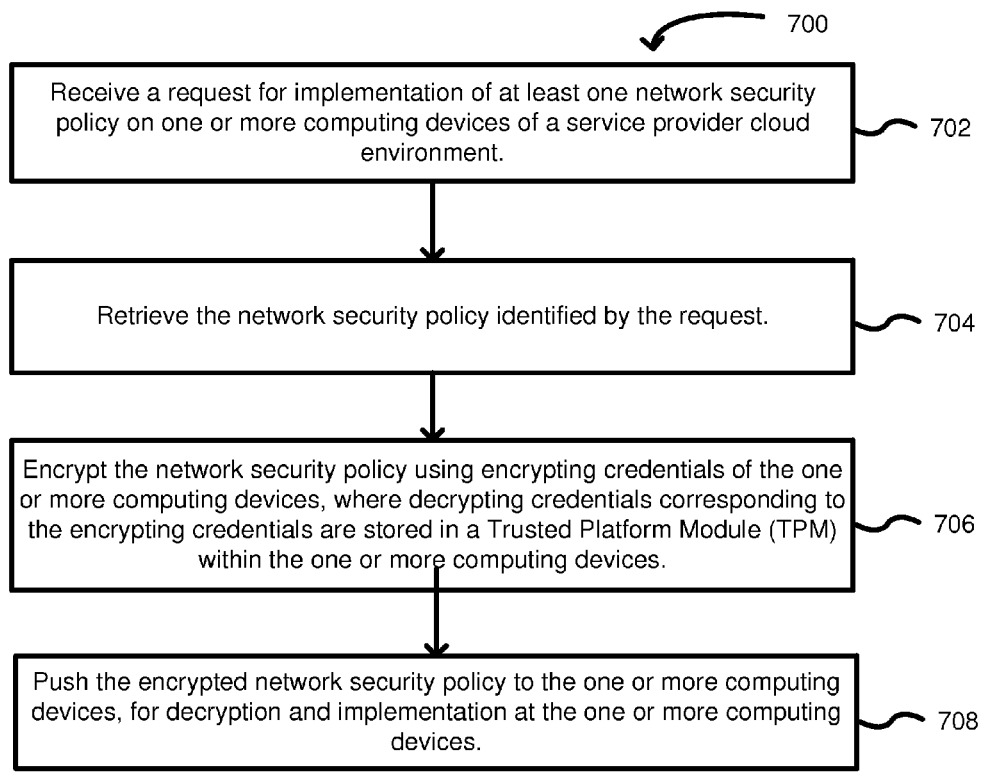
FIGS. 7-8 are flowcharts of example methods for implementing a network security policy in a distributed system of a service provider, in accordance with an embodiment of the disclosure.
Figure 8:
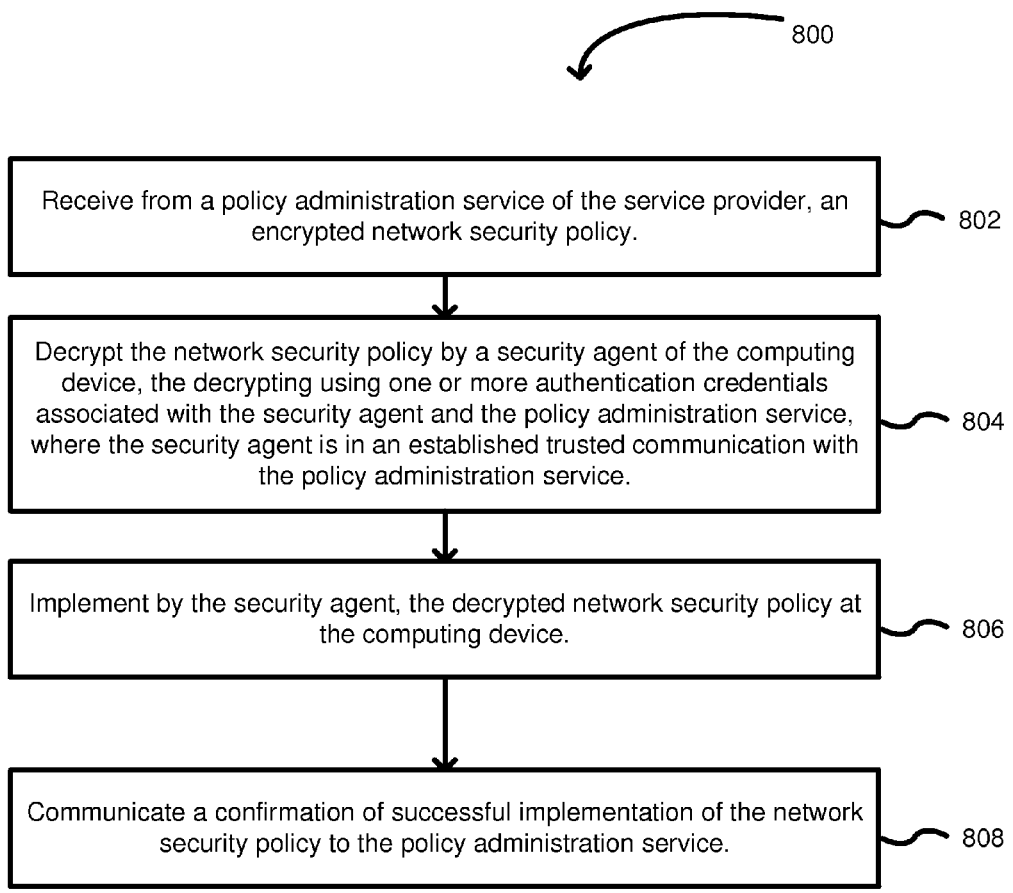

FIGS. 7-8 are flowcharts of example methods for implementing a network security policy in a distributed system of a service provider, in accordance with an embodiment of the disclosure. Referring to FIGS. 1-3 and 7, the example method 700 may start at 702, when the PAS 122 may receive a request (e.g., 120) for implementation of at least one network security policy (e.g., 134) on one or more computing devices (e.g., 102, . . . , 104) of a service provider cloud environment (e.g., 100). At 704, the network security policy (134) identified by the request (120) may be retrieved (e.g., from the request 120 or the database 142). At 706, the PAS 122 may encrypt the network security policy (134) using encrypting credentials of the one or more computing devices (e.g., 126, 136). Decrypting credentials (e.g., 111 and 113) corresponding to the encrypting credentials (126, 124) may be stored in a Trusted Platform Module (TPM) (112) within the one or more computing devices (102). At 708, the encrypted network security policy (e.g., 140) may be pushed by the PAS 122 to the one or more computing devices, for decryption and implementation at the one or more computing devices.

Referring to FIGS. 1-3 and 8, the example method 800 may start at 802, when the security agent (110) of the computing device (102) may receive from a policy administration service (122) of the service provider (100), an encrypted network security policy (140). At 804, the security agent (110) may decrypt the network security policy. The decrypting may use one or more authentication credentials (e.g., 111, 113) associated with the security agent and the policy administration service. The security agent may have an established trusted communication with the policy administration service (122). At 806, the security agent (110) may implement the decrypted network security policy at the computing device (112). At 808, a confirmation (e.g., 115) of successful implementation of the network security policy may be communicated to the policy administration service (122).

In example implementation, the policy administration service (122) may be communicatively coupled to the plurality of server computers (102, . . . , 104), and may be operable to receive a request (301) for a policy implementation, the request including information identifying at least two of the plurality of VMIs (e.g., 106, . . . , 108, 304) and a network security policy for implementation at the identified VMIs. The PAS (122) may retrieve the network security policy identified by the request, may retrieve authentication credentials associated with one or more of the plurality of server computers running the identified VMIs, and may encrypt the network security policy using the authentication credentials (e.g., generating NSP packages 316a, 316b using credentials associated with each of the servers 102, 104). The PAS (122) may then push the encrypted network security policy (316a, 316b) to the one or more servers running the identified VMIs, for decryption and implementation at the identified VMIs.

Figure 9:
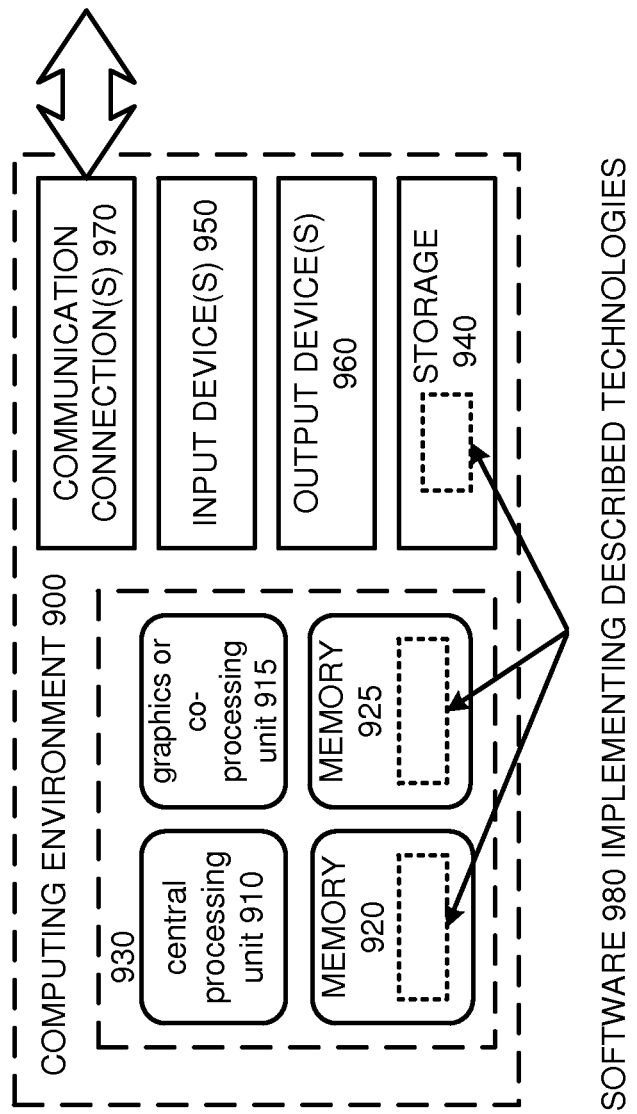
FIG. 9 depicts a generalized example of a suitable computing environment in which the described innovations may be implemented.

FIG. 9 depicts a generalized example of a suitable computing environment in which the described innovations may be implemented. Referring to FIG. 9, the computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations (e.g., functionalities) described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A computer-readable storage medium including instructions that upon execution cause a computer system to:
   receive, by the computer system, a request for implementation of at least one network security policy on one or more other computing devices of a service provider cloud environment;
   retrieve, by the computer system, the network security policy identified by the request, wherein the network security policy comprises secure cryptographic keys for establishing secure network connections with different computing devices;
   encrypt, by the computer system, the network security policy using encrypting credentials of the one or more computing devices, wherein decrypting credentials, comprising private cryptographic keys, corresponding to the encrypting credentials are stored in a Trusted Platform Module (TPM) within the one or more computing devices; and
   push, by the computer system, the encrypted network security policy to the one or more computing devices, for decryption of the encrypted network security policy using the private cryptographic keys stored in the TMPs within the one or more computing devices, and for implementation of the network security policy at the one or more computing devices;
   wherein the secure cryptographic keys are usable by the one or more computing devices to establish secure network connections with the different computing devices.

2. The computer-readable storage medium according to claim 1, wherein the one or more computing devices comprise a server computer hosting one or more virtual machine instances associated with a customer entity account, and the request is for implementation of the at least one network security policy at the server computer hosting the one or more virtual machine instances.

3. The computer-readable storage medium according to claim 2, wherein the instructions, upon execution further cause the computer system to:
   verify the one or more virtual machine instances running on the server computer are associated with the customer entity account.

4. The computer-readable storage medium according to claim 1, wherein the request identifies at least one of a plurality of virtual machine instances running on at least one of the computing devices, the network security policy for implementation at the identified virtual machine instance.

5. The computer-readable storage medium according to claim 1, wherein the request identifies a plurality of virtual machine instances running on a computing device, wherein each virtual machine instance comprises a TPM that is implemented as software running on a hypervisor associated with its respective virtual machine instance.

6. The computer-readable storage medium according to claim 1, further including:
   receiving a confirmation from the one or more computing devices of decryption and implementation of the network security policy at the one or more computing devices.

7. The computer-readable storage medium according to claim 1, wherein the network security policy comprises at least one of:
   one or more Internet Protocol Security (IPSec) keys;
   one or more network protocol settings;
   one or more firewall settings or rules;
   one or more Access Control Lists (ACLs);
   bandwidth usage rules;
   rules specifying restrictions of communications to/from instances or between instances;
   type of packets allowed for communication between instances; or
   meta-language description of communication restrictions.

8. The computer-readable storage medium according to claim 1, wherein the instructions, upon execution further cause the computer system to:
   receive, from a computing device of the one or more computing devices, an original hash of the network security policy as initially implemented at the computing device;
   send, to the computing device, a request for a current hash of the network security policy implemented at the computing device;
   receive, from the computing device, the current hash of the network security policy implemented at the computing device;
   verify the current hash against the original hash; and
   output an indication of whether the current hash matches the original hash.

9. A method for implementing network security policies at a computing device of a service provider, the method comprising:
   receiving from a policy administration service running on a different computing device of the service provider, an encrypted network security policy, wherein the encrypted network security policy comprises a secure cryptographic key for establishing a secure network connection with a different computing device;
   acquiring one or more authentication credentials, comprising private cryptographic keys, from a Trusted Platform Module (TPM) within the computing device;
   decrypting the network security policy by a security agent of the computing device, the decrypting using the one or more authentication credentials associated with the security agent and the policy administration service, wherein the security agent is in an established trusted communication with the policy administration service;
   implementing by the security agent, the decrypted network security policy at the computing device, comprising:
      installing the secure cryptographic key; and
      establishing a secure network connection with the different computing device using the secure cryptographic key; and
   communicating a confirmation of successful implementation of the network security policy to the policy administration service.

10. The method according to claim 9, comprising:
   verifying a signature of the policy administration service using the one or more authentication credentials.

11. The method according to claim 9, wherein the authentication credentials comprise at least one of a public-private key pair or a multi-level set of secure keys.

12. The method according to claim 9, wherein the network security policy is associated with one or more virtual machine instances running on the computing device.

13. The method according to claim 9, wherein the network security policy is associated with a plurality of virtual machine instances running on the computing device, wherein each virtual machine instance comprises a TPM that stores authentication credentials and is implemented as software running on a hypervisor of its respective virtual machine instance.

14. The method according to claim 9, comprising:
   sending to the policy administration service, a confirmation of successful implementation of the network security policy at the computing device.

15. The method according to claim 14, wherein the confirmation comprises a first hash of the network security policy as implemented at the computing device.

16. The method according to claim 15, comprising:
   in response to a request from the policy administration service for verifying the network security policy, requesting a second hash of the network security policy from the computing device, the second hash for comparing to the first hash to perform the verifying.

17. The method according to claim 9, comprising:
   receiving a request from the policy administration service for verifying the network security policy implemented at the computing device;
   in response to the request:
      generating a hash value of the network security policy implemented at the computing device;
      encrypt the generated hash value using a public key from the TPM;
      signing the encrypted hash value using a private key; and
      sending the signed encrypted hash value to the policy administration service.

18. The method according to claim 9, wherein the secure cryptographic key is a secure sockets layer (SSL)/transport layer security (TLS) key or an Internet Protocol Security (IPSec) key, and wherein the secure network connection with the different computing device is an SSL/TLS connection or an IPSec connection.

19. A method for implementing network security policies at a computing device of a service provider, the method comprising:
   receiving from a policy administration service running on a different computing device of the service provider, an encrypted network security policy, wherein the encrypted network security policy comprises firewall rules for restricting communications with different computing devices;
   acquiring one or more authentication credentials, comprising private cryptographic keys, from a Trusted Platform Module (TPM) within the computing device;
   decrypting the network security policy by a security agent of the computing device, the decrypting using the one or more authentication credentials associated with the security agent and the policy administration service, wherein the security agent is in an established trusted communication with the policy administration service;
   implementing by the security agent, the decrypted network security policy at the computing device, comprising:
      installing the firewall rules; and
      restricting network communications to or from the computing device based on the firewall rules; and communicating a confirmation of successful implementation of the network security policy to the policy administration service.

20. The method according to claim 19, comprising:

receiving a request from the policy administration service for verifying the network security policy implemented at the computing device;

in response to the request:
  generating a hash value of the firewall rules installed at the computing device;
  signing the hash value using a private key; and
  sending the signed hash value to the policy administration service for verification.

\* \* \* \* \*